Dec. 29, 1953         E. VAN RIPER ET AL         2,663,905
              SUPERIMPOSED MULTIPLE CAVITY MOLD
Filed Sept. 6, 1951                              2 Sheets-Sheet 2
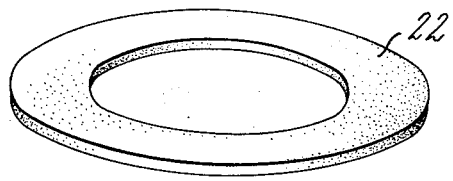
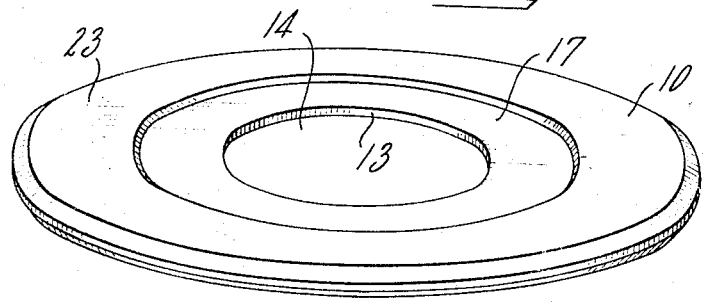
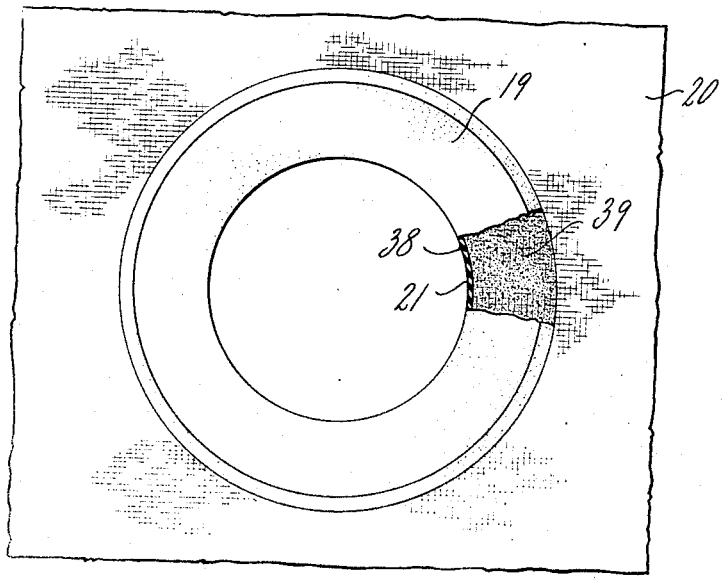
INVENTORS
ELMER VAN RIPER
GEORGE W. FREY
BY
*William N. Eper*
ATTORNEY Patented Dec. 29, 1953

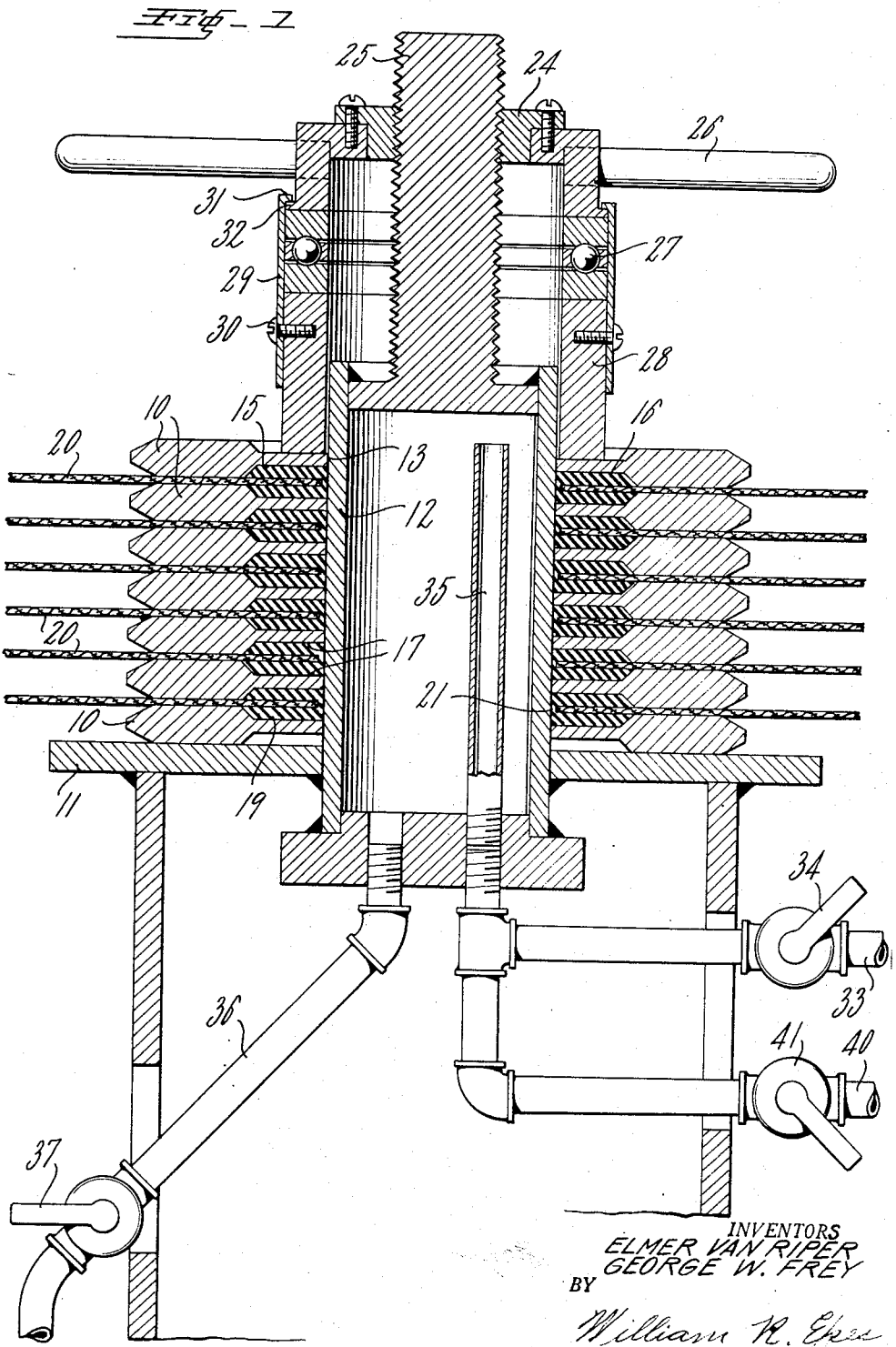

2,663,905

UNITED STATES PATENT OFFICE 2,663,905

SUPERIMPOSED MULTIPLE CAVITY MOLD

Elmer Van Riper, Rochelle Park, and George W. Frey, Wyckoff, N. J., assignors to United States Rubber Company, New York, N. Y., a corporation of New Jersey Application September 6, 1951, Serial No. 245,286

4 Claims. (Cl. 18—17)

This invention relates to an improved method and apparatus for molding rings of plastic material, or plastic grommets, such as eyelets around openings in sheet material, particularly textile fabric.

Heretofore, plastic rings and grommets have been molded in cavities formed between mold plates where the heat required to cure or set the plastic was conducted by the mold plates from the outer periphery thereof to the cavities therein. This required an exterior heating packet to be placed around the mold if the heat treatment was to be applied in a vulcanizing press, or the clamped together mold parts were placed in a heated autoclave. In either case a greater amount of labor and apparatus was required to heat and handle the molds.

In accordance with the present invention the molding and heat curing apparatus is simplified by the elimination of the exterior heating jacket and by heating the plastic in the mold cavities with heat conducted by the mold plates from the interior thereof. Such changes are accompanied by a saving in the labor of handling the molds and a more efficient manner of applying the heat to the mold cavities. The increase in the heating efficiency is particularly noticeable in the grommet curing operation.

The above and other objects and advantages of this invention will be further described in reference to the accompanying drawings, in which:

Fig. 1 is a cross sectional view of a molding apparatus embodying this invention, and illustrating the method of molding grommets, or eyelets around openings in pieces of sheet fabric;

Fig. 2 is an isometric view of a raw or uncured plastic ring, one of which is to be placed on each side of the fabric and around the opening therein to be molded into a unitary grommet;

Fig. 3 is an isometric view of a mold plate; and

Fig. 4 is a plan view of a plastic grommet molded around an opening in a piece of sheet fabric, in which a part of the grommet is broken away to illustrate its construction.

The method and apparatus embodying this invention is illustrated in the drawing in connection with the molding of grommets around openings in sheet material, such as textile fabrics, but it will be understood that when the fabric is omitted, individual plastic rings may be molded in this apparatus. As shown in Figs. 1 and 3, the molding apparatus comprises a plurality of superimposed mold plates 10, which are supported on a base 11 having a hollow cylindrical post 12 secured thereto and extending through the peripheries 13 of circular openings 14 in the mold plates. The mold plates 10 are removable from the post 12 and the peripheries 13 of the opening therein have a slidable fit on the post. Mold cavities 15 are formed between the adjacent plates 10 for the reception of plastic material 16, such as vulcanizable rubber compounds, which is molded and set in the form of rings, or grommets. As shown in the drawings, circular recesses 17 are formed on each side of the mold plates 10. The recesses 17 extend radially outwardly from the periphery 13 of the openings 14 in the plates to form one-half of the mold cavity 15 between the adjacent plates 10.

In molding grommets 19 on sheet material 20 around opening 21 therein, as shown in the finished form in Fig. 4, the plastic 16 is placed in the mold cavity 15 in two parts, comprising rings 22, as shown in Fig. 2, which are placed on each side of the sheet material 20, which latter extends beyond the rings 22 and is clamped between the adjacent elevated rims 23 of the mold plates 10.

The superimposed mold plates 10 are clamped together under pressure by a capstan 24, which is threaded onto a stem 25 secured to the post 12. The capstan 24 is manually operated by handles 26. A ball ring thrust bearing 27 is interposed between the capstan 24 and a pressure ring 28, which bears against the mold plates 10. A split sleeve 29 is secured to the pressure ring 28 by screws 30, and it is provided with a flange 31 which overhangs a shoulder 32 on the capstan 24 for the purpose of holding the capstan and pressure ring assembly together.

After the molding apparatus has been loaded with the plastic 16 to be molded, the inner member, or hollow cylindrical post 12 is heated to cure, or thermoset the plastic 16 in the mold cavities 15. The inner member 12 is heated, as shown in Fig. 1, by admitting a heating fluid, preferably steam, to the interior of the post 12 from a pipe 33 which is connected to a source of supply. The steam is turned on or off at the will of the operator by a valve 34, which is adapted to connect the pipe 33 to a pipe 35 having an outlet within and near the top of the hollow post 12. The condensate from the steam is drained from the interior of the post 12 through a pipe 36 which is connected to the bottom of the interior of the post 12. The drainage from the post 12 is controlled by valve 37.

In the practice of the method of applying grommets 19 to openings 21 in the fabric pieces 20, the openings preferably are so cut that their peripheries fit loosely around the post 12 and allow the plastic rings 22 on each side of the fabric 20 to flow together and form a continuous layer 38 of plastic around the periphery of the opening in the fabric 20 and through the axis of the grommet 19, as shown in Fig. 4. The margins of the sheet fabric around the openings 21 to be covered by the grommets are coated with layers 39 of adhesive compatible with the moldable plastic material 16 of which the grommets 19 are made, for the purpose of producing a good bond between the plastic 16 and the fabric 20. The plastic rings 22, as shown in Fig. 2 are preferably cut out of calendered sheet stock, such as a vulcanizable rubber compound. The molding apparatus is then loaded with the uncured plastic rings 22 and the fabric 21, as illustrated in Fig. 1.

At the beginning of the loading operation, the capstan 24 and pressure ring 28 assembly, and the mold plates 10, excepting the bottom plate, are removed from the post 12. A plastic ring 22 is placed in the recess 17 of the bottom mold plate 10. The bottom piece of fabric 20 is then placed over the ring 22 and the plate 10 by passing the opening 21 therein over the top of the post 12. A second plastic ring 22 is then placed over the post 12 and on top of the fabric 20, so as to cover the margin 39 around the opening 21 in the fabric. A second plate 10 is then placed over the post 12 and on top of the fabric 21. Successive layers of rings 22 and fabric 21 sandwiched therebetween, and mold plates 10 are superimposed upon each other around the post 12, so as to form the successive grommets 19 around the openings in the fabric. After a sufficient number of mold cavities 15 have thus been formed and filled, the capstan 24 is threaded onto the stem 25 at the top of the inner post 12, and pressure is applied to the mold plates 10 between the pressure ring 28 and the base plate 11 by turning the capstan down on the stem 25. In so doing the outer periphery of the mold cavity 15 is sealed by the pressure exerted between the elevated outer peripheral faces 23 of the mold plates 10 as a result of the pressure exerted on the plates axially of the openings 13 therein, or perpendicular to the faces of the plates. The fabric 20 extending between the elevated faces 23 of the mold plates 10 acts as a gasket, and thereby assists in the formation of a seal to prevent flash from being extruded between the plates 10 at the outer peripheries of the mold cavities 15.

The interior of the post 12 is then heated by admitting steam to the interior thereof through the pipe 35. As the interior of the cylindrical cavity in the post 12 is heated, the outer surface of the post expands more than the periphery of the opening 13 in the plates 10. It is desirable that the clearance between the post 12 and the inner peripheries 13 of the plates when cold be sufficiently small to form a seal on the inner periphery of the mold cavities, and thereby prevent flash from extruding between the plates 10 and the post 12. During the heating of the moldable material 16, further pressure is exerted on the plates 10 by turning down the capstan 24 on the stem 25 of the post 12. The heat is conducted from the walls of the post 12 directly to the plastic 16 making contact therewith, and indirectly to the plastic through the mold plates 10 which make contact with the outer periphery of the post 12. The plastic 16 is heated for a sufficient period of time to thermoset or cure it to the desired degree. During the curing cycle the plastic becomes softened and flows under the pressure of the capstan 24 around the peripheries of the openings 21 in the fabric 20 so as to provide a continuous wall 38 of plastic for the axial opening in each grommet. The softened plastic under the pressure of the capstan is bonded to the fabric 21 with the aid of the adhesive coating 39, which was previously applied around the margin of the opening in the fabric to be covered by the plastic 16 forming the grommet 19. At the end of the curing cycle the steam supply is cut off by closing the valve 34.

In order to cool the mold plates 10, and thereby facilitate their removal from the post 12, and handling at a reduced temperature at the end of the curing cycle, cooling water is admitted to the interior of the post 12. The cooling water is supplied from a pipe 40 by opening a valve 41 which connects the pipe 40 to the inlet pipe 35 opening into the interior of the post 12. The condensate control valve 36 is opened so as to permit the discharge of the cooling water from the interior of the post 12 at the desired rate.

During the cooling cycle the capstan assembly 24 with the pressure ring 28 may be removed from the post 12, and after the post 12 has been cooled sufficiently to cause the contraction thereof in the event it has been tightly expanded against the inner peripheries 13 of the plates, the superimposed mold plates 10 and fabrics 20 with the grommets 19 thereon are removed from around the posts.

The superimposed layers of fabric 20 droop downwardly over the outer peripheries of the mold plates and insulate the mold plates from the outside atmosphere, and thereby retain the heat in the mold cavities 15, which is supplied from the interior of the post 12. If the fabric 20 is omitted and rings are being molded, the heat may be retained in the mold cavities by an insulating bag (not shown) which may be placed over the capstan 24 and around the mold plates 10.

This apparatus is particularly advantageous in molding grommets on fabric because the heat is supplied to the mold cavities from the interior of the ring shaped mold plates and it is difficult to transmit the heat to the cavities from the outside thereof through the insulating layers of fabric. Furthermore, where heat is supplied from the exterior the direct application of the heat or steam to the fabric 20 in some cases discolors or shrinks it.

Whereas, the mold disclosed in the drawings has a ring shaped mold cavity, which extends to the periphery 13 of the opening 14 in the mold plate 10, and is closed at its inner periphery by the post 12, the mold cavity may encircle the opening and lie wholly within the face of the mold plates as shown in United States Patent No. 2,148,079. The periphery of such mold cavity may be of any shape and have any desired number of sides.

Whereas, the preferred form of the method and apparatus has been described more or less in detail herein, it will be understood that changes may be made in this invention as described without departing from the spirit of the invention, and the scope of the appended claims.

Having thus described our invention, what we claim and desire to protect by Letters Patent is:

1. A molding apparatus comprising a hollow post, a plurality of superimposed mold plates, each of said plates including an end plate having a central opening adapted to fit over and in slidable contact with said post, said plates and posts forming the walls of mold cavities surrounding said post and interposed between said plates, means for applying pressure to the face of said end plate and thereby force said plates towards each other, and means for admitting and exhausting heating fluid to and from said hollow post to conduct heat to said mold cavities.

2. A molding apparatus comprising a base, a plurality of superimposed mold plates supported on said base and having openings therein, a recessed margin extending outwardly from and around said openings in said plates and within the inner periphery of elevated sealing rims thereon so as to form a mold cavity between adjacent faces of said plates, a common post extending through said openings in said plates, means for alternately heating and cooling said post, the peripheries of said opening in said plates having slidable fits on said post when it is cooled and a tight fit when heated, and means for clamping said plates together on said base.

3. A molding apparatus comprising a base, a plurality of superimposed mold plates supported on said base and having openings therein, a hollow post extending through said openings, means for alternately supplying and exhausting a heating and a cooling medium to and from the interior of said post, the peripheries of said openings in said plates having slidable fits on said post after being cooled by said cooling medium and a tight fit after being heated by said heating medium, and means for clamping said plates together on said base.

4. A molding apparatus comprising a base, a plurality of superimposed mold plates supported on said base free from any surrounding structure and having openings therein, a hollow post secured to said base and extending through said openings, a removable capstan on said post for clamping said plates together on said base, means for alternately supplying and exhausting a heating and a cooling medium to and from the interior of said post, the peripheries of said openings having a slidable fit on said post after being cooled by said cooling medium and a tight fit after being heated by said heating medium, each of said plates having a recessed margin extending outwardly from and around said opening therein and within an elevated sealing rim thereon so as to form a mold cavity between adjacent plates.

ELMER VAN RIPER.
GEORGE W. FREY.

References Cited in the file of this patent
UNITED STATES PATENTS

| Number | Name | Date |
| --- | --- | --- |
| 1,396,158 | Bonner | Nov. 8, 1921 |
| 2,253,792 | Leavenworth | Aug. 26, 1941 |
| 2,389,178 | Blount et al. | Nov. 20, 1945 |
| 2,569,303 | Garbin | Sept. 25, 1951 |